Oct. 8, 1957　　　　　J. B. OWENS ET AL　　　　　2,809,244
ELECTRICAL SWITCH
Filed Sept. 18, 1953　　　　　　　　　　　　　　8 Sheets-Sheet 1

WITNESSES:
Robert Baird
Wm. L. Groome

INVENTORS
James B. Owens &
Herbert J. Crabbs.
BY
ATTORNEY

Oct. 8, 1957

J. B. OWENS ET AL 2,809,244

ELECTRICAL SWITCH

Filed Sept. 18, 1953

WITNESSES:
Robert C Baird
Wm. L. Groove

INVENTORS
James B. Owens &
Herbert J. Crabbs.
BY
ATTORNEY

Oct. 8, 1957  J. B. OWENS ET AL  2,809,244
ELECTRICAL SWITCH

Filed Sept. 18, 1953  8 Sheets—Sheet 8

WITNESSES:
Robert C. Baird
Wm. C. Groome

INVENTORS
James B. Owens &
Herbert J. Crabbs.
BY
ATTORNEY

United States Patent Office 2,809,244
Patented Oct. 8, 1957

2,809,244

ELECTRICAL SWITCH

James B. Owens, Jeannette, and Herbert J. Crabbs, Pittsburgh, Pa., assignors to Westinghouse Electric Corporation, East Pittsburgh, Pa., a corporation of Pennsylvania Application September 18, 1953, Serial No. 380,962

14 Claims. (Cl. 200—50)

Our invention relates, generally, to electric switches and, more particularly, to switches of a by-pass type.

In connection with the operation of electrical devices of certain types, such as induction regulators, booster transformers and current transformers, it is desirable to be able to deenergize the device without interrupting the flow of electric power in the load circuit in which the device is normally connected. In order to isolate an induction regulator in this manner, the usual switching arrangement requires one by-pass and two isolating switches for each phase of the regulator.

In such an arrangement the switches are sequentially operated to close the by-pass switch first and then open the isolating switches, thereby isolating the regulator without interrupting the supply of power to the load. The regulator is restored to operation by first closing both isolating switches and then opening the by-pass switch.

In the past, the three switches required for regulator operation have been combined into one unit to perform all the required functions. Such a device consisted of two isolating switches mounted on one pair of insulators. The switches were mechanically coupled together, but insulated from each other electrically. In addition, a bypass member was actuated by movement of the isolating blades to connect the two stationary contact members of the isolators when the isolating blades were moved to the open position.

While the prior devices incorporated into one unit all the functions of the three switches required for the usual switching arrangement, they have not been entirely satisfactory because of the fact that the by-pass member was moved toward the by-passing position only upon movement of the isolating blades. It was intended that the by-pass circuit be completed before the isolating contacts separated. In order to accomplish this sequence careful adjustment was required and there was always the danger that the isolators would open first, thereby creating load-current arcs which might cause serious damage to the equipment.

One object of our invention, generally stated, is to provide a by-pass switch which shall be simple and efficient in operation and which may be economically manufactured and installed.

A more specific object of our invention is to provide a by-pass switch in which the by-passing member is actuated towards its closed position before there is any movement to separate the contact members of the isolating blades.

Another object of our invention is to provide a by-pass switch having a centrally pivoted by-pass member which is actuated by the hook eye for actuating the main blades of the switch.

A further object of our invention is to provide for positive closing of the by-pass member before opening the isolating members of a by-pass switch.

Other objects of our invention will be explained fully hereinafter or will be apparent to those skilled in the art.

In accordance with one embodiment of our invention, a hook eye, which may be engaged by a switch stick, is pivoted on the hinged isolating blades of a switch and carries a pin which engages the slotted end of a pivoted by-pass blade. The first pull of the switch stick rotates the hook eye about its pivot point, thereby actuating the by-pass blade towards its closed position. After the by-pass blade is fully closed, a projection on the hook eye releases a latch which holds the isolating blades closed, thereby permitting these blades to open as the pull on the switch stick is continued. During the closing operation, the reverse sequence is followed.

For a better understanding of the nature and objects of the invention, reference may be had to the following detailed description, taken in conjunction with the accompanying drawings, in which.

Figure 1:
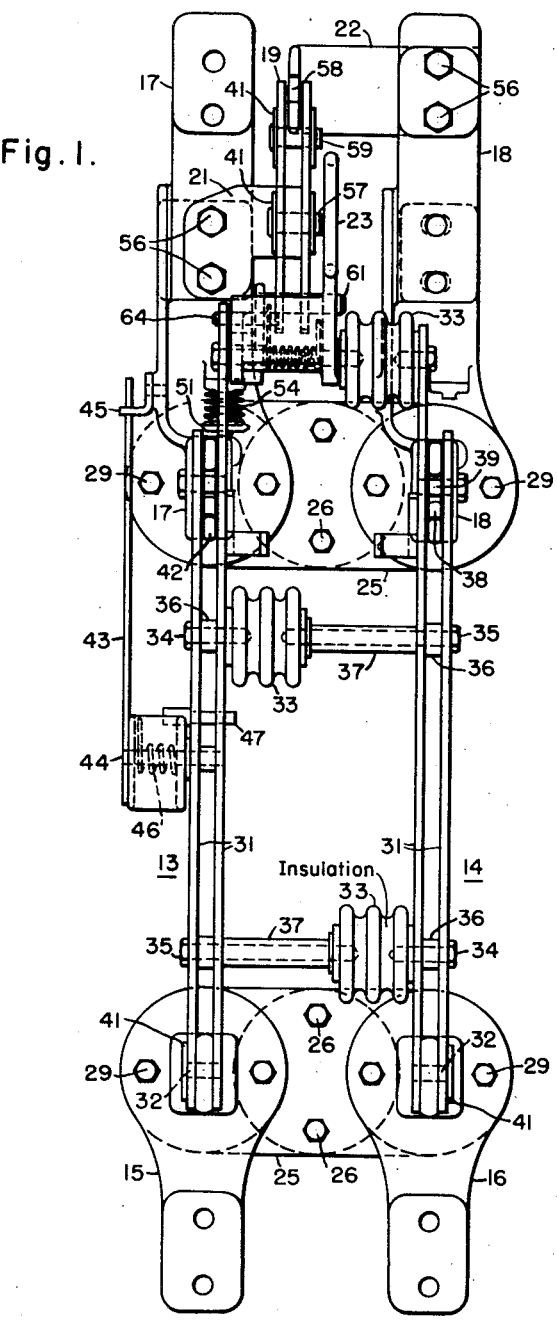
Figure 1 is a view, in front elevation, of a by-pass switch embodying the principal features of the invention.

Referring to the drawings, and particularly to Figs. 1 to 4, inclusive, the switch shown therein comprises, generally, a channel-shaped base 10, a pair of supporting insulators 11 and 12, a pair of switch blades 13 and 14 which are hinged on hinge contact terminal members 15 and 16 respectively and engage break contact terminal members 17 and 18 respectively, a by-pass switch blade 19 which is pivotally mounted on a by-pass hinge tongue 21 and engages a by-pass break tongue 22, and an actuating member or hook eye 23 which is carried by the switch blades 13 and 14. The base 10 may be attached to any suitable support such as a pole or structural framework (not shown).

Figure 2:
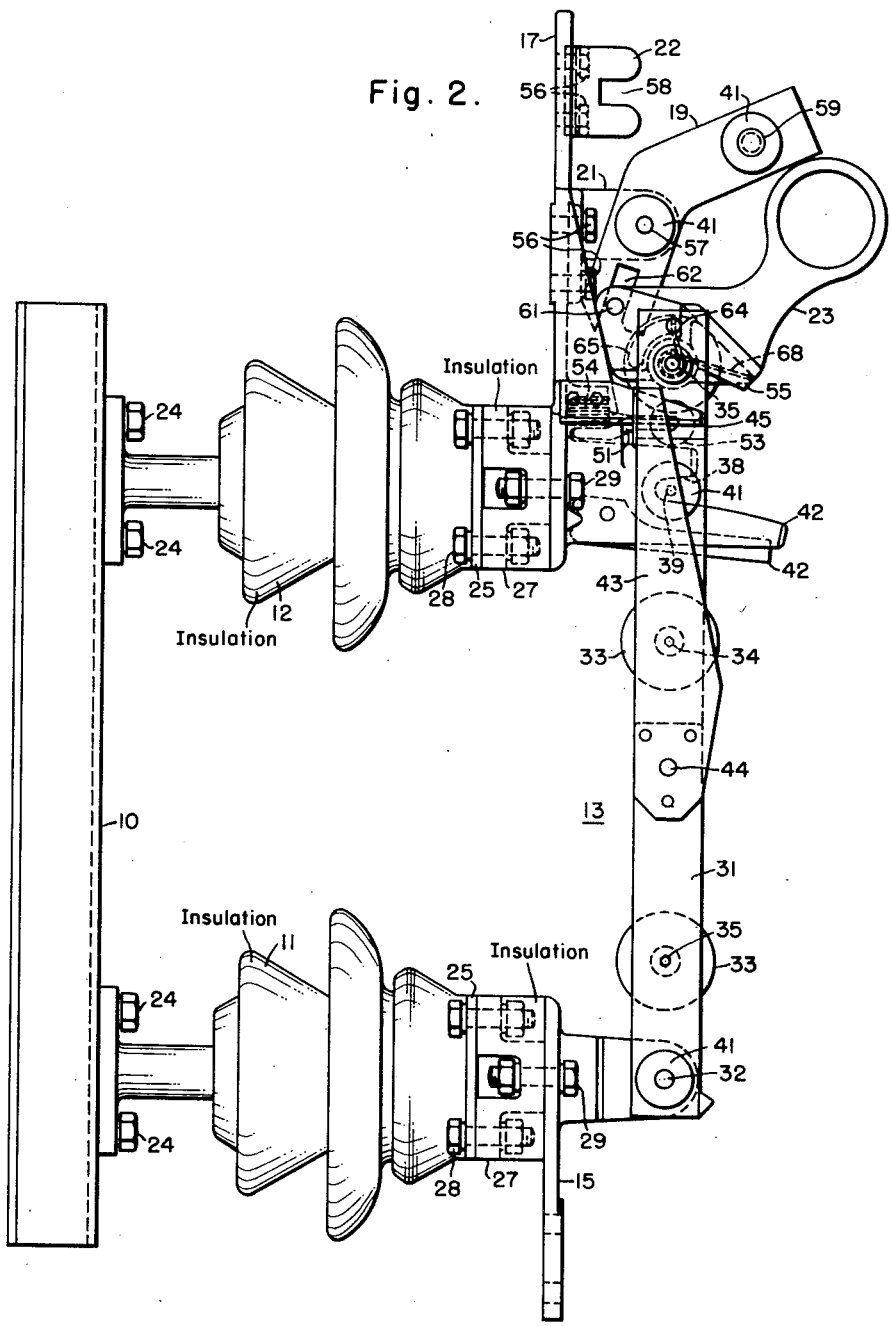
Fig. 2 is a view, in side elevation, of the switch shown in Fig. 1.

As shown in Fig. 2, the insulators 11 and 12 may be attached to the base 10 by bolts 24. As shown in Fig. 1, a metal plate 25 may be attached to the top of each one of the insulators 11 and 12 by bolts 26. As shown more clearly in Fig. 2, two insulating members 27 may be attached to each one of the metal plates 25 by bolts 28. As shown most clearly in Fig. 1, the hinge contact terminal member 15 may be attached to one of the insulating members 27 by bolts 29. The other hinge contact terminal member 16 may be attached to the other insulating member 27 on the insulator 11 by bolts 29. Likewise, the break contact terminal members 17 and 18 may be attached to the insulating members 27 on the insulator 12 by bolts 29.

As shown most clearly in Fig. 1, each one of the switch blades 13 and 14 comprises two spaced bars 31. The blades 13 and 14 are pivotally mounted on the hinge contacts 15 and 16, respectively, by hinge pins 32. The blades 13 and 14 are tied together by one or more insulators 33 having oppositely extending bolts 34 and 35 in the ends thereof. The bolts 34 and 35 have relatively short spacing sleeves 36 thereon for spacing the two bars 31 of each switch blade. The bolts 35 also have relatively long spacing sleeves 37 thereon for spacing the blades 13 and 14.

In accordance with the usual practice in switches of the disconnect type, each break contact terminal is provided with a notch 38 for receiving in the closed circuit position a bolt or pin 39 which connects the two bars of each one of the switch blades 13 and 14. The hinge pins 32 and the break pins 39 may be provided with spring washers 41 to increase the contact pressure in a manner well known in the art. As shown most clearly in Figs. 2 and 3, the break contact terminals 17 and 18 are provided with blade guides or extensions 42.

The switch may be provided with a quick break blade 43. The blade 43 is mounted on a pin 44 carried by the main switch blade 13. When the main blade is in the closed position, the blade 43 is latched underneath a contact 45 which is attached to the break contact terminal 17. As the main switch blade 13 opens, torsion is applied to a spring 46 prior to the disengagement of the blade 43 from the contact 45. When the blade 43 is released from the contact 45 the spring 46 causes the blade 43 to move upwardly rapidly, thereby interrupting any arc that may be drawn between the blade 43 and the contact 45. The upward movement of the blade 43 is limited by a stop pin 47 carried by the main switch blade 13.

Figure 3:
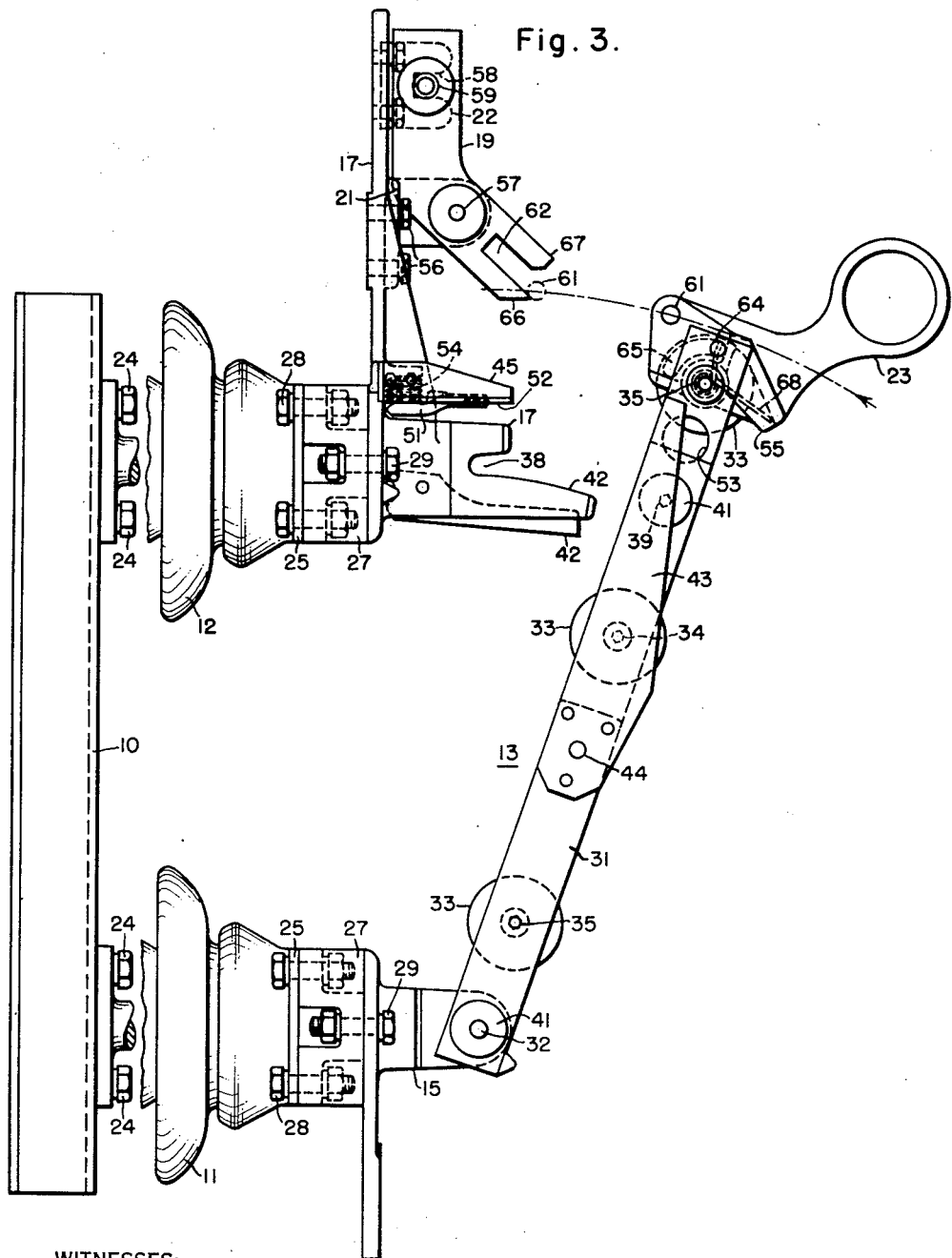
Fig. 3 is a view, in side elevation, showing the main blades of the switch open.
Figure 4:
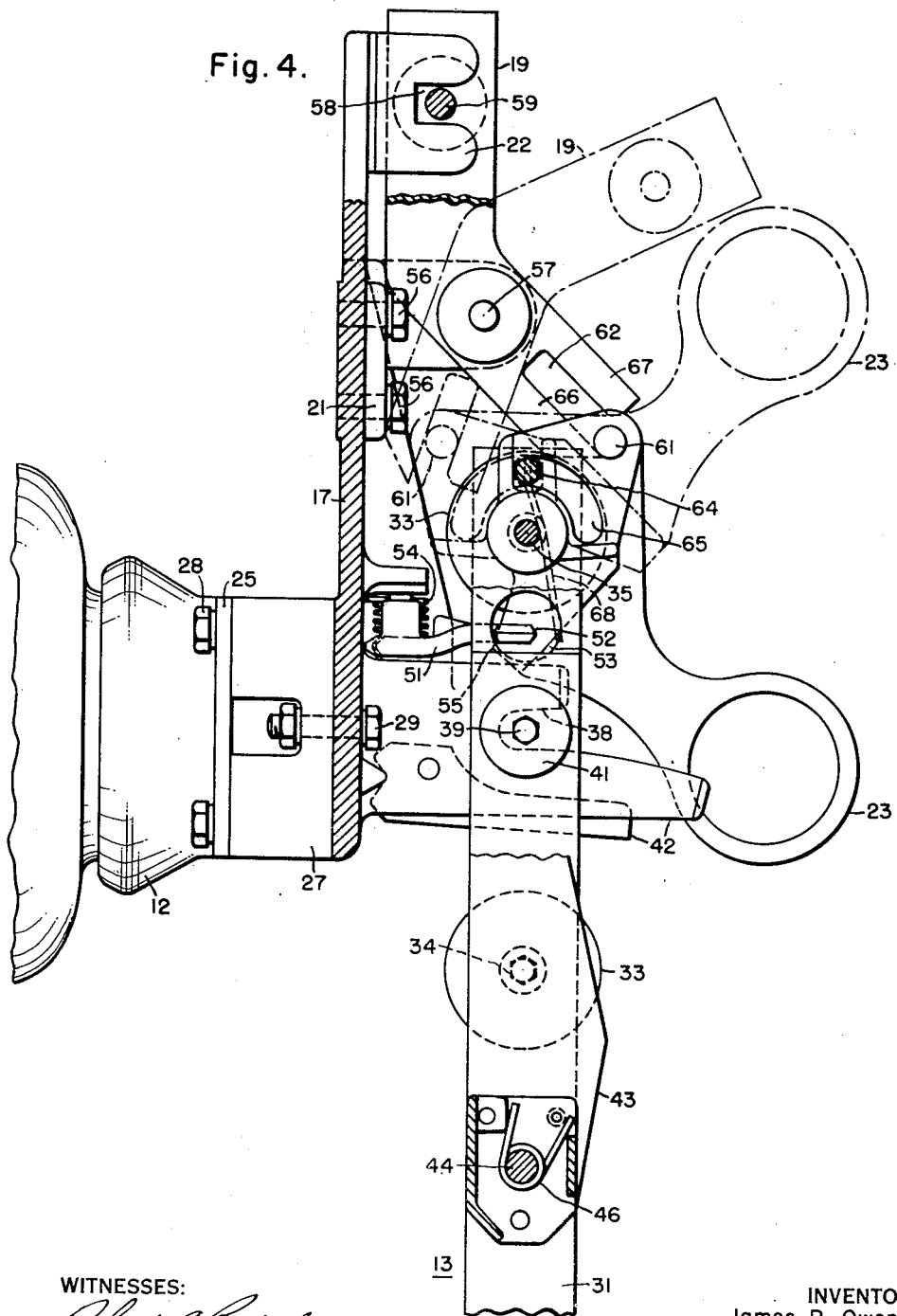
Fig. 4 is an enlarged view, in side elevation, portions of the switch being broken away to show details of construction.

As shown most clearly in Figs. 3 and 4, a spring-biased latch 51 is provided for retaining the main switch blades 13 and 14 in the closed position. The latch 51 is pivotally mounted on the break contact terminal 17 and has a hook portion 52 which enters a hole 53 in one of the bars 31 of the blade 13 when the blade 13 is in the closed position. The hook 52 is biased into the opening 53 by a spring 54. As will be explained more fully hereinafter, the latch 51 is released by a projection 55 on the actuating member 23 during operation of the switch.

As explained hereinbefore, it is desirable to be able to deenergize certain electrical devices, such as an induction regulator, without interrupting the flow of electric power in the load circuit in which the regulator is normally connected. In order to isolate an induction regulator in this manner, it is necessary to provide a by-pass switch member which is closed prior to the opening of the main isolating switch blades of the switch. Regulator by-pass switches constructed heretofore have required careful adjustment to maintain the proper sequence of operation between the by-pass switch blade and the main isolating switch blades.

In order to overcome some of the deficiencies of prior switches, we have devised the present switch in which the operation of the by-pass blade 19 is so controlled by the actuating member 23 that the by-pass blade 19 must always engage the by-pass break contact member 22 before the isolating switch blades 13 and 14 are disengaged from the break contact members 17 and 18, respectively.

As shown in Figs. 1 to 4, the by-pass switch blade 19 comprises two generally arcuate members which are pivotally mounted on opposite sides of an upwardly extending portion of the by-pass hinge tongue 21. The hinge tongue 21 is attached to the break contact terminal 17 by bolts 56. The by-pass blade 19 is attached to the hinge tongue 21 by a pin or bolt 57. The by-pass break tongue 22, which is attached to the break contact terminal 18 by bolts 56, has a notch 58 in an upwardly extending portion thereof for receiving a pin or bolt 59 which extends through the by-pass blade 19. Thus, when the by-pass blade 19 is in the closed position, the break contact terminals 17 and 18 are electrically connected, thereby providing a by-pass circuit around the isolating switch blades 13 and 14 which are in the open position, as shown in Fig. 3, when the by-pass blade 19 is in the closed position. Spring washers 41 are provided on the bolts 57 and 59 to increase the contact pressure between the members of the by-pass blade 19 and the members 21 and 22.

As previously explained, the by-pass blade 19 is actuated by the hook eye or actuating member 23. As shown most clearly in Fig. 1, the actuating member 23 is pivotally mounted on one of the bolts 35 which ties the main switch blades 13 and 14 together.

As shown most clearly in Figs. 2, 3 and 4, the actuating member 23 has an eccentrically mounted pin 61 therein. As shown in Fig. 2, the pin 61 is disposed in an open-ended slot 62 in the by-pass blade 19 when the main switch blades 13 and 14 are in the closed position and the by-pass blade 19 is in the open position.

Figure 5:
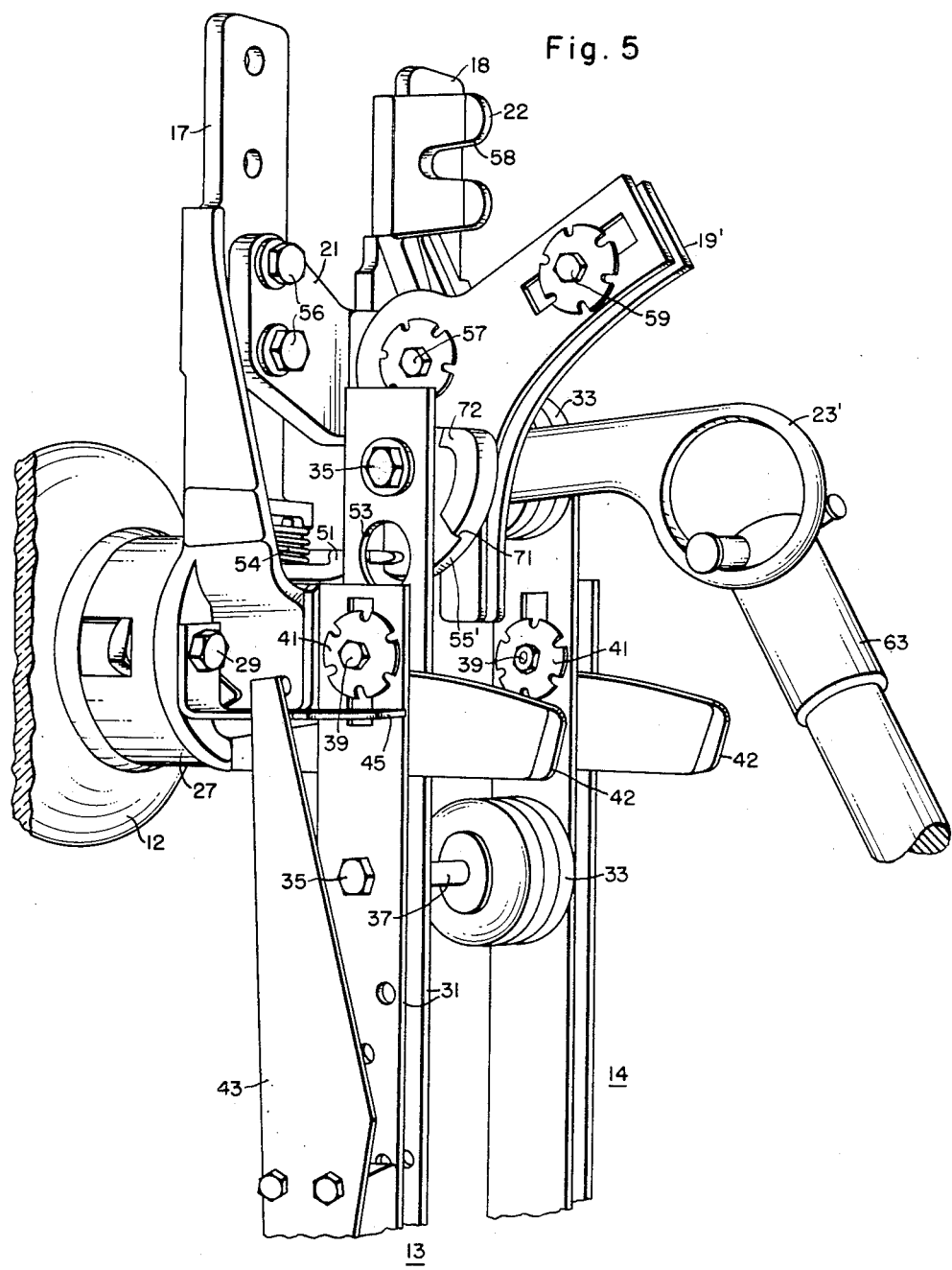
Fig. 5 is an enlarged view, in perspective, of a modification of the switch shown in Fig. 1.

The main switch blades 13 and 14 may be opened by engaging the actuating member 23 with a hook stick 63, as shown in Fig. 5, and pulling generally downwardly on the member 23. Since the main blades 13 and 14 are held closed by the latch 51, the actuating member 23 rotates about its pivot point from the position shown by the broken lines in Fig. 4 to the position shown by the solid lines. The rotation of the member 23 swings the pin 61 from the position shown by the broken lines to the position shown by the solid lines in Fig. 4. This movement of the pin 61 in the slot 62 actuates the by-pass blade 19 from its open position shown by the broken lines to its closed position shown by the solid lines, prior to any movement of the main switch blades 13 and 14.

Rotation of the actuating member 23 about its pivot pin 35 is limited by a stop pin 64 which extends through the end of the blade 13 and has one end disposed in a groove 65 provided in a flange on the actuating member 23. As the actuating member 23 approaches the end of its clockwise rotation, the projection 55 on the actuating member engages the hook portion 52 of the latch 51 to release the latch from the blade 13. A continued downward pull on the actuating member 23 causes the main switch blades 13 and 14 to swing about their hinge pin 32, thereby opening the main switch blades.

As shown in Fig. 3, the pin 61 leaves the slot 62 as the main switch blades are opened and enters the slot 62 as the main blades are being closed. The entering of the pin 61 into the slot 62 as the main blades are being closed causes the pin 61 to engage a lower arm 66 of the by-pass blade 19 which is somewhat longer than an upper arm 67. The engagement of the pin 61 with the arm 66 as the main blades are being closed causes the by-pass blade 19 to be opened. However, the by-pass blade 19 is not opened until after the main switch blades 13 and 14 have engaged the guide extensions 42 of the break contact terminals 17 and 18, thereby re-establishing the circuit through the main switch blades prior to the opening of the by-pass blade.

The actuating member 23 is normally biased to the position shown in Fig. 2 by a spring 68, thereby overcoming any tendency of gravity to cause the member 23 to close the by-pass blade 19 while the main switch blades 13 and 14 are closed during normal operation of the regulator or other device connected in the power circuit. In order to close the by-pass blade, the foregoing procedure of actuating the member 23 must be followed.

Since the main switch blades 13 and 14 cannot be opened until after the by-pass blade 19 is closed, there is no possibility of an improper sequence of operation during opening of the main switch blades. Likewise, the proper sequence of operation of the main switch blades and the by-pass switch blade is obtained during closing of the main switch blades and opening of the by-pass switch blade.

Figure 6:
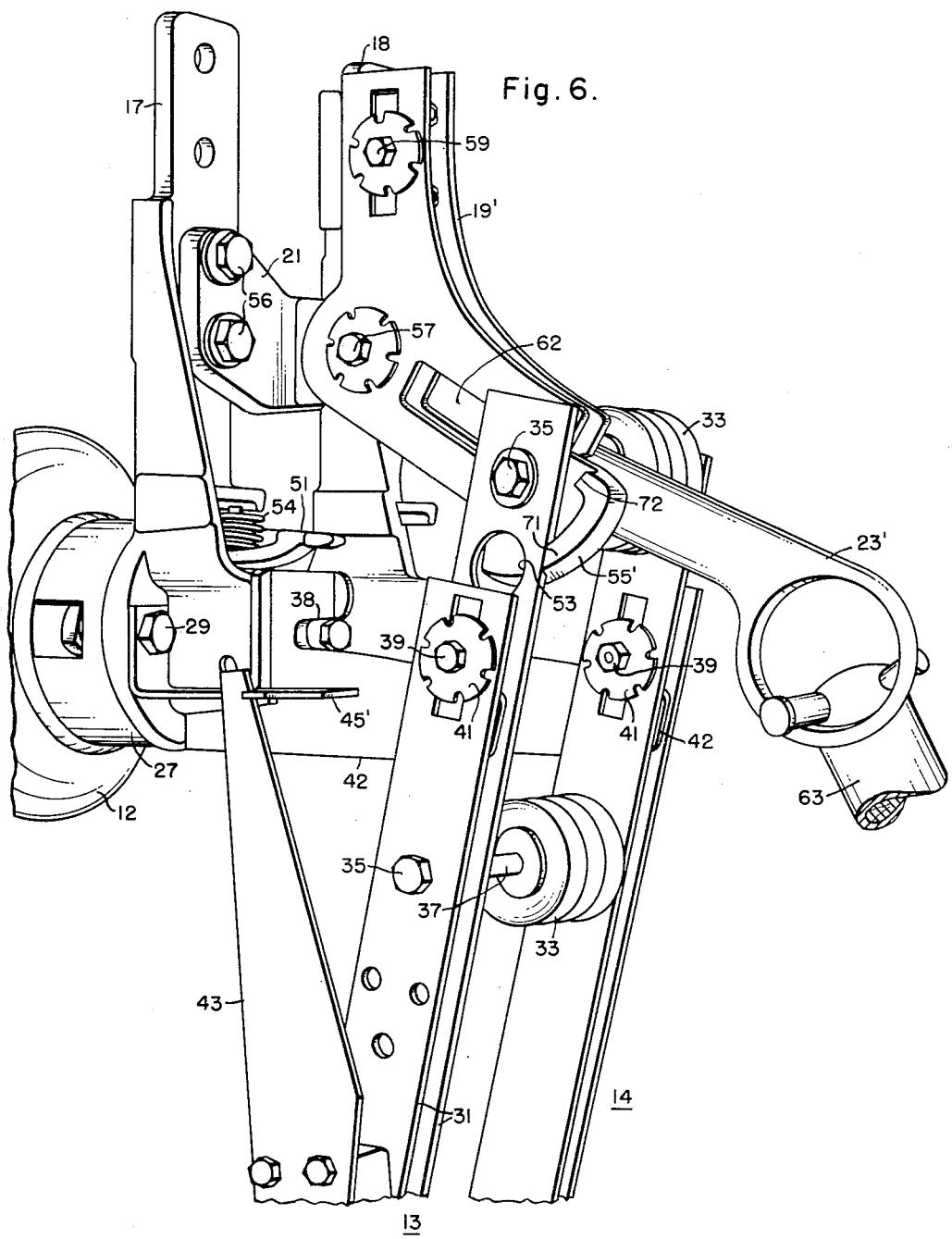
Fig. 6 is a view, similar to Fig. 5, showing the main blades of the switch partly open.

In the modification of the invention shown in Figs. 5 and 6, in which like parts are designated by the same reference characters as in Figs. 1 to 4, the by-pass blade 19' is of the same general arcuate shape as the by-pass blade 19. Likewise, the actuating member of hook eye 23' is of the same general shape as the member 23. The member 23' is pivotally mounted on one of the bolts 35 which ties the main switch blades together.

In the present structure, the bolt 35 not only supports the actuating member 23' but is also utilized to operate the by-pass blade 19'. As shown in Fig. 5, the bolt 35 is disposed in the slot 62 in the by-pass blade 19' when the main switch blades 13 and 14 are closed and the by-pass blade 19' is open. As shown in Fig. 6, the bolt 35 leaves the slot 62 as the main blades 13 and 14 are being opened and enters the slot 62 as the main blades are being closed.

The main blades may be opened by engaging the hook eye 23' with the hook stick 63 as shown in Fig. 5. A downward pull on the stick 63 rotates the actuating member 23' about its pivot bolt 35. The rotation of the member 23' causes the projection 55' to engage the latch 51 to release the latch from engagement with the blade 13, thereby permitting the blades 13 and 14 to swing about their hinge pin. The bolt 35 which is disposed in the slot 62 swings with the blades 13 and 14, thereby closing the by-pass blade 19'. As shown in Fig. 6, the by-pass blade 19' is fully closed before the main switch blades 13 and 14 are disengaged from the guide extensions 42 on the break terminals 17 and 18.

During opening of the main switch blades, rotation of the actuating member 23' in a clockwise direction about its pivot bolt 35 is limited by a shoulder 71 on a flange of the actuating member 23'. During closing of the main switch blades, rotation of the member 23' in a counter-clockwise direction is limited by a shoulder 72 on the member 23'. The shoulders 71 and 72 engage the upper edge of one of the bars 31 of the main switch blade 13.

Since the by-pass blade 19' must be fully closed before the bolt 35 leaves the slot 62 and the main switch blades 13 and 14 are disengaged from the extensions 42 on the break terminals, the circuit through the by-pass blade 19' is completely established before the circuit through the main blades is opened. Likewise, upon closing the main switch blades, they engage the extensions 42 before the bolt 35 enters the slot 62 to open the by-pass switch blade 19'. Accordingly, the proper sequence of operation between the main switch blades and the by-pass blade is secured.

Figure 7:
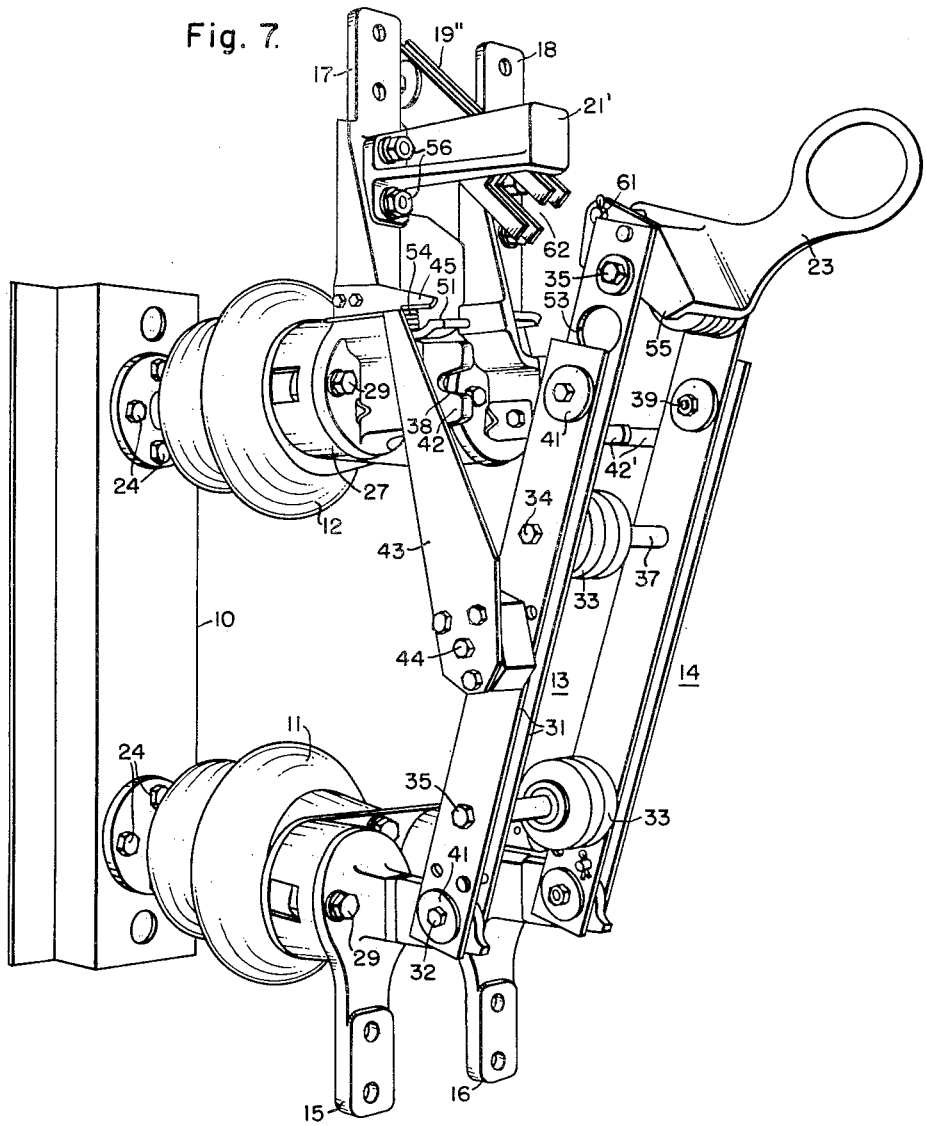
Fig. 7 is a view, in perspective, of another modification of the switch.
Figure 8:
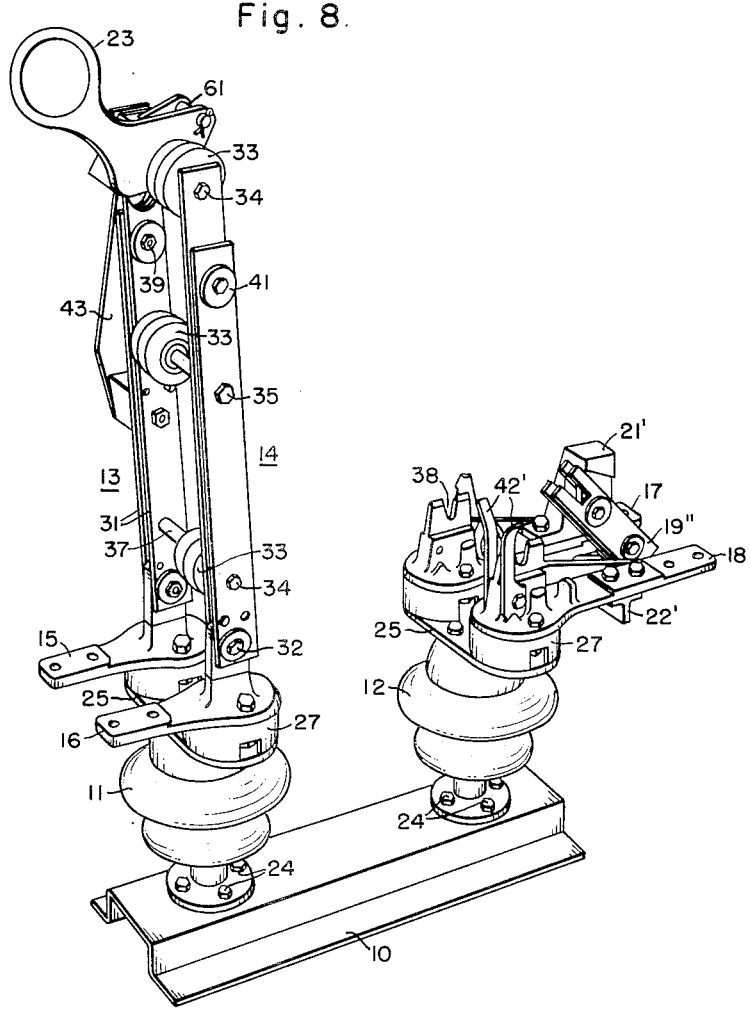
Fig. 8 is another view, in perspective, of the switch shown in Fig. 7.

The modification of the invention shown in Figs. 7 and 8 is of the same general structure structure as shown in Figs. 1 to 4. In the present structure, the by-pass blade 19'' is straight instead of being arcuate in shape. It is pivotally mounted on a by-pass hinge member 21' which is attached to the break contact terminal 17. The by-pass break tongue 22' is mounted on the bottom of the break contact terminal 18 instead of on top of the terminal. The guide extensions 42' are slightly different from the extensions 42 previously described. Otherwise, the present structure is substantially the same as previously described and the operation of the switch is the same.

During opening of the switch, the actuating member 23 rotates about its pivot pin 35, thereby causing the pin 61, which is disposed in the slot 62, to close the by-pass blade prior to movement of the main switch blades 13 and 14. During closing of the switch the main blades 13 and 14 engage the blade extensions 42' prior to the opening of the by-pass blade 19.''

From the foregoing description, it is apparent that we have provided a switch of the by-pass type which accomplishes the desired sequential operation of the switch members and which is relatively simple in construction. Furthermore, the parts of the switch are so constructed that it is impossible for them to get out of adjustment to cause improper operation of the switch members. Improper operation will result only from complete failure of some of the members of the switch.

Since numerous changes may be made in the above-described constructions and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. In an electric switch, in combination, a pair of spaced contact members, a pair of hinged switch blades engaging said contact members, an actuating member pivoted on said blades for opening and closing the blades, a pivoted by-pass member for electrically connecting said contact members, said by-pass member having an open slot in one end thereof, a pin on the actuating member disposed in said slot to close the by-pass member prior to opening movement of the switch blades about their hinge points, said pin being removed from said slot during opening of the switch blades, a latch for holding the hinged blades closed, and a projection on the actuating member for releasing said latch, said by-pass member being closed and said latch being released and said hinged blades being opened by moving the actuating member in one direction.

2. In an electric switch, in combination, spaced contact members, hinged switch blades engaging said contact members, an actuating member carried by said blades for opening and closing the blades, a pivoted by-pass member for electrically connecting said contact members, said by-pass member having an open slot in one end thereof, actuating means movable with the actuating member and disposed in said slot to actuate the by-pass member about its pivot point, said actuating means being removed from said slot during opening of the switch blades, a latch for holding the hinged blades closed, and a projection on the actuating member for releasing said latch, said by-pass member being opened by said actuating means before said latch engages the hinged blades during the closing of the hinged blades.

3. In an electric switch, in combination, spaced contact members, hinged switch blades engaging said contact members, an actuating member pivoted on said blades for opening and closing the blades, a by-pass member for electrically connecting said contact members, said by-pass member being pivoted at a point intermediate its ends and having an open slot in one end thereof, a pin carried by the switch blades and disposed in said slot to actuate the by-pass member about its pivot point, said pin being removed from said slot during opening of the switch blades, a latch for holding the hinged blades closed, and a projection on the actuating member for releasing said latch, said by-pass member being opened by said pin before said latch engages the hinged blades during the closing of the hinged blades.

4. In an electric switch, in combination, spaced contact members, hinged switch blades engaging said contact members, an actuating member pivoted on said blades for opening and closing the blades, a by-pass member for electrically connecting said contact members, said by-pass member being arcuate in shape and having contact engaging means at one end and an open slot in the other end and pivoted at a point between said ends, a pin carried by the switch blades and disposed in said slot to actuate the by-pass member about its pivot point, said pin being removed from said slot during opening of the switch blades, a latch for holding the hinged blades closed, and a projection on the actuating member for releasing said latch, said by-pass member being opened by said pin before said latch engages the hinged blades during the closing of the hinged blades.

5. In an electric switch, in combination, a pair of switch contact members, a pair of hinged switch blades engaging said contact members, an actuating member pivoted on said blades for opening and closing the blades, by-pass switch members spaced from but electrically connected to said switch contact members, a by-pass blade connecting said by-pass switch members, said by-pass blade having contact engaging means at one end and an open slot in the other end and being pivoted between said ends, a pin in the actuating member disposed in said slot to close the by-pass blade by actuating it about its pivot point prior to opening movement of the switch blades about their hinge points, said pin being removed from said slot during opening of the switch blades, a latch for holding the switch blades closed, and a projection on the actuating member for releasing said latch, said by-pass blade being closed and said latch being released and said hinged blades being opened by moving the actuating member in one direction.

6. In an electric switch, in combination, a pair of switch contact members, a pair of hinged switch blades engaging said contact members, an actuating member pivoted on said blades for opening and closing the blades, by-pass switch members spaced from but electrically connected to said switch contact members, a by-pass blade connecting said by-pass switch members, said by-pass blade having contact engaging means at one end and an open slot in the other end and being pivoted between said ends, a pin in the actuating member disposed in said slot to actuate the by-pass blade about its pivot point prior to opening movement of the switch blades about their hinge points, said pin being removed from said slot during opening of the switch blades, a latch for holding the switch blades closed, and a projection on the actuating member for releasing said latch, said pin and said projection being so disposed that said latch is released only after the by-pass blade is in its closed position, said by-pass blade being closed and said latch being released and said hinged blades being opened by moving the actuating member in one direction.

7. In an electric switch, in combination, a pair of switch contact members, a pair of hinged switch blades engaging said contact members, an actuating member pivoted on said blades for opening and closing the blades, by-pass switch members spaced from but electrically connected to said switch contact members, a by-pass blade connecting said by-pass switch members, said by-pass blade being arcuate in shape and having contact engaging means at one end and an open slot in the other end and being pivoted between said ends, a pin eccentrically mounted in the actuating member and disposed in said slot to close the by-pass blade by actuating it about its pivot point prior to opening movement of the switch blades about their hinge points, a spring-biased latch for holding the switch blades closed, and a projection on the actuating member for releasing said latch, said by-pass blade being closed and said latch being released and said hinged blades being opened by moving the actuating member in one direction.

8. In an electric switch, in combination, a pair of switch contact members, a pair of hinged switch blades engaging said contact members, an actuating member pivoted on said blades for opening and closing the blades, by-pass switch members spaced from but electrically connected to said switch contact members, a by-pass blade connecting said by-pass switch members, said by-pass blade being arcuate in shape and having contact engaging means at one end and an open slot in the other end and being pivoted between said ends, a pin eccentrically mounted in the actuating member and disposed in said slot to actuate the by-pass blade about its pivot point prior to opening movement of the switch blades about their hinge points, a spring-biased latch for holding the switch blades closed, and a projection on the actuating member for releasing said latch, said pin and said projection being so disposed that said latch is released only after the by-pass blade is in its closed position, said by-pass blade being closed and said latch being released and said hinged blades being opened by moving the actuating member in one direction.

9. In an electric switch, in combination, a pair of spaced contact members, a pair of hinged switch blades engaging said contact members, an actuating member pivoted on said blades for opening and closing the blades, a pivoted by-pass member for electrically connecting said contact members, said by-pass member having an open slot in one end thereof, a pin eccentrically mounted in the actuating member and disposed in said slot to close the by-pass member prior to opening movement of the switch blades about their hinge points, a latch supported independently of the hinged switch blades for holding said blades closed, and a projection on the actuating member for releasing said latch, said by-pass member being closed and said latch being released and said hinged blades being opened by moving the actuating member in one direction.

10. In an electric switch, in combination, spaced contact members, hinged switch blades engaging said contact members, an actuating member pivoted on said blades for opening and closing the blades, a by-pass member for electrically connecting said contact members, said by-pass member being pivoted at a point intermediate its ends and having an open slot in one end thereof, a pin carried by the switch blades and disposed in said slot to actuate the by-pass member about its pivot point, said pin being removed from said slot during opening of the switch blades, a spring-biased latch supported independently of the hinged switch blades and engaging said blades to hold them closed, and a projection on the actuating member for releasing said latch, said by-pass member being opened by said pin before said latch engages the hinged blades during the closing of the hinged blades.

11. In an electric switch, in combination, a pair of hinge contact terminal members, a pair of break contact terminal members, a switch blade hinged on each one of the hinge members and engaging one of the break members, insulating means tying said blades together, an actuating member carried by said blades for engaging the blades with the break contact terminal members and for disengaging the blades from the break members, a by-pass hinge tongue electrically connected to one of said break contact terminal members, a by-pass break tongue electrically connected to the other break contact terminal member, a by-pass blade pivoted on the by-pass hinge tongue and having an open slot in one end, actuating means associated with said actuating member and disposed in said slot for actuating the by-pass blade into engagement with the break tongue prior to disengagement of the switch blades from the break contact terminal members, said actuating means being removed from said slot during opening of the switch blades, and said by-pass blade being opened by said actuating means before the switch blades are fully engaged with the break contact terminal members during closing of the switch blades.

12. In an electric switch, in combination, a pair of hinge contact terminal members, a pair of break contact terminal members, a switch blade hinged on each one of the hinge members and engaging one of the break members, insulating means tying said blades together, an actuating member carried by said blades for disengaging the blades from the break members, a by-pass hinge tongue electrically connected to one of said break contact terminal members, a by-pass break tongue electrically connected to the other break contact terminal member, a by-pass blade pivoted on the by-pass hinge tongue and having an open slot in one end, actuating means associated with said actuating member and disposed in said slot for actuating the by-pass blade into engagement with the break tongue prior to disengagement of the switch blades from the break contact terminal members, said actuating means being removed from said slot during opening of the switch blades, a latch for holding the switch blades closed, and a projection on the actuating member for releasing said latch, said by-pass blade being opened by said actuating means before said switch blades are engaged by said latch during closing of the switch blades.

13. In an electric switch, in combination, a pair of hinge contact terminal members, a pair of break contact terminal members, a switch blade hinged on each one of the hinge members and engaging one of the break members, an insulated bolt tying said blades together, an actuating member mounted on said bolt for engaging the blades with the break contact terminal members and for disengaging the blades from the break members, a by-pass hinge tongue mounted on one of said break contact terminal members, a by-pass break tongue mounted on the other break contact terminal member, a generally arcuate by-pass blade pivoted on the by-pass hinge tongue and having an open slot in one end, said bolt which supports the actuating member being disposed in said slot to actuate the by-pass blade into engagement with the break tongue prior to disengagement of the switch blades from the break contact terminal members, said bolt being removed from said slot during opening of the switch blades, and said by-pass blade being opened by said actuating means before the switch blades are fully engaged with the break contact terminal members during closing of the switch blades.

14. In an electric switch, in combination, a pair of hinge contact terminal members, a pair of break contact terminal members, a switch blade hinged on each one of the hinge members and engaging one of the break members, an insulated bolt tying said blades together, an actuating member mounted on said bolt for disengaging the blades from the break members, a by-pass tongue mounted on one of said break contact terminal members, a by-pass break tongue mounted on the other break contact terminal member, a generally arcuate by-pass blade pivoted on the by-pass hinge tongue and having an open slot in one end, said bolt which supports the actuating member being disposed in said slot to actuate the by-pass blade into engagement with the break tongue prior to disengagement of the switch blades from the break contact terminal members, said bolt being removed from said slot during opening of the switch blades, a spring-biased latch supported independently of the switch blades for holding them closed, and a projection on the actuating member for releasing said latch, said by-pass blade being opened by said actuating means before said switch blades are engaged by said latch during closing of the switch blades.

References Cited in the file of this patent

UNITED STATES PATENTS

| | | |
|---|---|---|
| 606,939 | Pfluger | July 5, 1898 |
| 1,747,035 | Steinmayer | Feb. 11, 1930 |
| 2,566,917 | Armstrong | Sept. 4, 1951 |
| 2,627,559 | Netzel | Feb. 3, 1953 |